United States Patent [19]
Mortus

[11] 3,747,656
[45] July 24, 1973

[54] LOCKNUT
[75] Inventor: Hal J. Mortus, Twinsburg, Ohio
[73] Assignee: The Lamson & Sessions Co., Cleveland, Ohio
[22] Filed: Dec. 22, 1971
[21] Appl. No.: 210,980

[52] U.S. Cl. .............................................. 151/21 B
[51] Int. Cl. ........................................ F16b 39/30
[58] Field of Search .................. 151/21 B, 22, 21 R

[56] References Cited
UNITED STATES PATENTS

| | | | |
|---|---|---|---|
| 1,101,501 | 6/1914 | Ward | 151/21 B |
| 1,228,671 | 6/1917 | Hibbard | 151/22 |
| 1,767,219 | 6/1930 | Maclean | 151/22 |
| 2,177,003 | 10/1939 | Purtell | 151/22 |
| 2,519,417 | 8/1950 | Tripp | 151/21 B |
| 3,240,248 | 3/1966 | Waltermire | 151/21 B |
| 3,460,428 | 8/1969 | Charles | 151/21 B |

*Primary Examiner*—Marion Parsons, Jr.
*Attorney*—J. Herman Yount, Jr. and Calvin G. Covell

[57] ABSTRACT

An improved locknut includes an internal screw thread having an outermost thread convolution with axially offset flank sections which are adapted to interfere with thread convolutions on an externally threaded member to provide a locking action between the nut and the externally threaded member. These axially offset flank sections are formed by a plurality of pressure pads or arcuate indentations which extend axially and radially inwardly from an outer face surface of the nut into the outermost thread convolution. Each of these indentations is formed by a continuously curving and concave surface having a maximum circumferential extent adjacent a line of intersection between the face surface and an opening extending through the nut. The concave surface of the indentation diminishes in circumferential extent in a direction extending radially inwardly from the circular line of intersection between the opening and face surface to form one of the axially offset sections of the outermost thread convolution. The continuously curving concave surface on each of the pressure pads advantageously forms a portion of a cone having its longitudinal axis extending at an acute angle to the longitudinal axis of the opening in the nut body.

7 Claims, 5 Drawing Figures

PATENTED JUL 24 1973 3,747,656

LOCKNUT

The present invention relates to a locknut and more particularly to a locknut having pressure pads or indentations in its outer end portion to provide interference with an externally threaded member.

There are many different types of known locknuts. Included among these is the type shown in the U.S. Pat. No. 2,519,417 wherein indentations are formed by rather sharp notches having flat surfaces which intersect at an angle. Due to the relatively sharp configuration of the notch, this known pressure pad tends to abrade or "die cut" the mating internal thread. In addition, the sharp notch of this known locknut has a generally triangular configuration with the base of the triangle located at the crest of the thread. Therefore, the area of maximum thread deflection is at the crest of the thread where cracks or separations can occur. The formation of these cracks or separations is promoted by the stress inducing configuration of the sharply notched indentation. Of course, this substantially impairs the operating life of the locknut and particularly the number of times which the locknut can be loosened and then subsequently retightened with the desired locking action.

Accordingly, it is an object of this invention to provide a new and improved locknut having arcuate pressure pads or indentations which are formed by a continuous surface to minimize the formation of stress concentrations.

Another object of this invention is to provide a new and improved locknut which has its greatest friction pressure at the base or major diameter of the internal thread to thereby tend to minimize the stress at the crest of the internal thread.

Another object of this invention is to provide a new and improved locknut having pressure pads or indentations which are formed by a concave and continuously curving axially offset portion of the internal threads to thereby promote the smooth deflection of a mating external thread and a desired locking action with a minimum of stress in both the external and internal threads.

These and other objects and features of the invention will become more apparent upon a consideration of the following description taken in connection with the accompanying drawings wherein.

Figure 1:
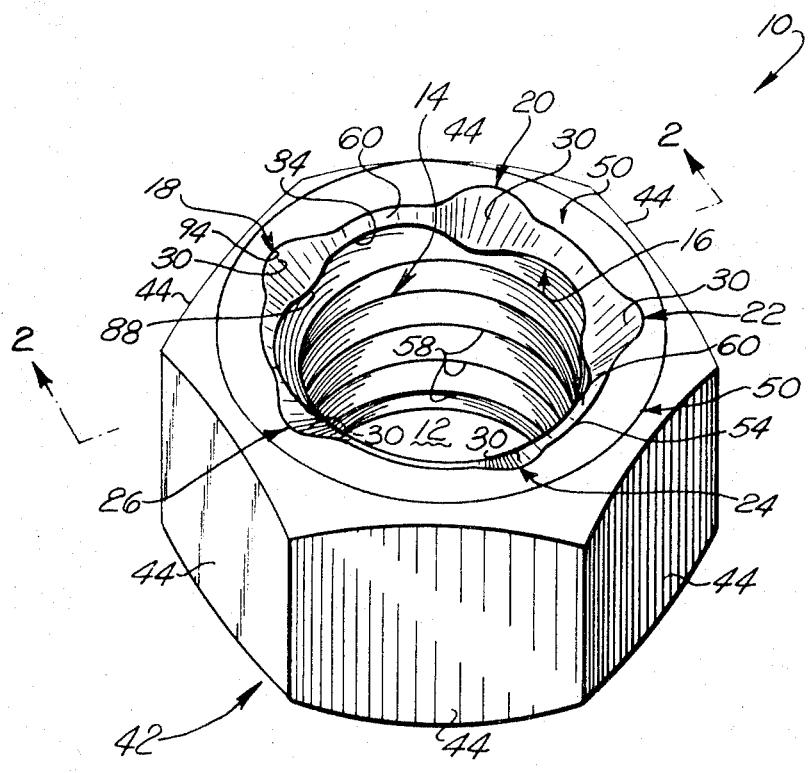
FIG. 1 is a pictorial illustration of a locknut having pressure pads or indentations formed in accordance with the present invention.

A locknut 10 constructed in accordance with the present invention includes an axially extending opening 12 having a sidewall on which an internal screw thread 14 is formed. In accordance with the present invention, a plurality of axially offset sections are formed in an outermost thread convolution 16 at pressure pads or arcuate indentations 18, 20, 22, 24 and 26 formed in an outer end portion of the locknut 10. Each of the pressure pads 18 to 26 has a continuously curving concave surface 30 which is free of stress inducing discontinuities. To tend to minimize the formation of cracks or separations in a crest 34 of the outermost thread convolution 16, the pressure pads 18 to 26 have their greatest circumferential extent at the base or root of the internal thread 16. To promote this relatively small deformation at the crest 34 of the thread convolution 16, the arcuate surface 30 is advantageously formed as a portion of a radially and axially inwardly extending cone 40 (see FIG. 2).

In accordance with common practice, the locknut 10 has a hexagonal metal body 42 with flats or side surfaces 44 which extend upwardly from a pressure or base surface 48 (FIG. 2) to an annular outer face surface 50. The face surface 50 has a generally circular line of intersection 54 with a countersunk opening to the axially extending hole 12. However, the generally circular line of intersection 54 is interrupted by the pressure pads 18 to 26.

To enable the locknut 10 to be readily engaged with a standard external screw thread, the internal screw thread 14 includes a plurality of standard internal screw thread convolutions 58. The standard screw thread convolutions 58 extend in a continuous helix from the base or pressure surface 48. Thus, the locknut 10 can be freely turned onto an externally threaded member until the outermost thread convolution 16 is engaged by the screw threads on the externally threaded member.

The arcuate indentations or pressure pads 18 to 26 provide for a smooth locking engagement between the screw thread on the externally threaded member and the locking thread convolution 16. This smooth engagement insures that the turns of the external thread convolution are not unduly abraded or "die cut." When the locknut 10 is being turned onto an externally threaded member, the flanks of the external thread convolution move into engagement with the pressure pads 18 to 26 of the lock thread convolution 16 and the external thread convolutions are displaced axially by each of the pressure pads in turn. The axially deflected portions of the external thread convolution travel along the external thread convolution like a wave of constant amplitude due to movement of a portion of the external thread convolution into and out of engagement with the pressure pads 18 to 26. This results in a firm locking action which is sustained even when there is no clamping force between the locknut 10 and members which are to be interconnected by the externally threaded member and the locknut.

As the screw thread on the externally threaded member moves into engagement with the outermost lock thread convolution 16, the axially offset pressure pads 18 to 26 are stressed due to pressure engagement between the internal and external threads. If a relatively high level of stress is induced at the crest 34 of the thread convolution 16, small cracks would start to form in the relatively weak crest of the thread convolution. To prevent this from occuring, the greatest friction pressure between the external screw thread and the internal lock thread convolution 16 is transmitted at the root or base of the internal thread convolution 16. Therefore, a relatively high locking pressure is applied to the external thread convolution by the base of the lock thread convolution 16 and a relatively low locking pressure is applied to the external thread convolution by the crest 34 of the lock thread convolution 16. This results in the relatively weak crest 34 of the internal thread convolution being subjected to a low level of stress.

Figure 3:
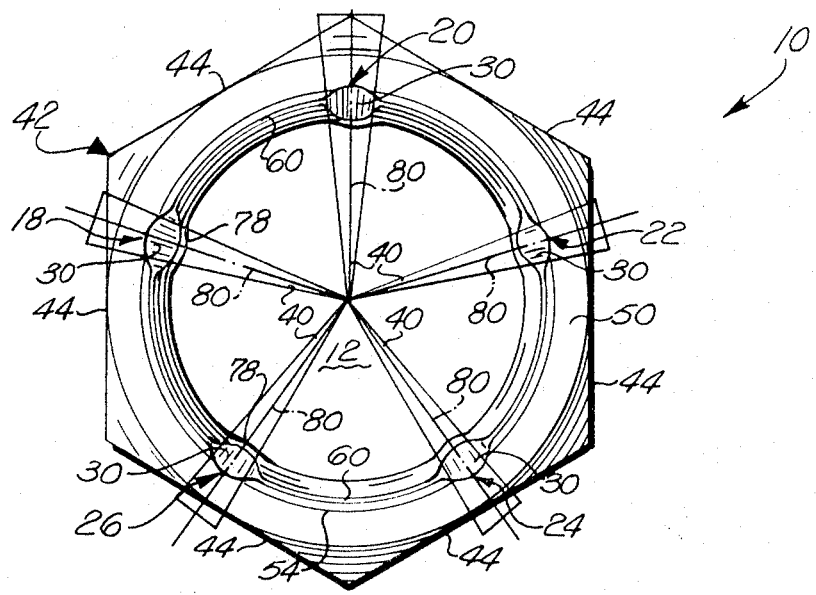
FIG. 3 is a plan view, taken generally along the line 3—3 of FIG. 2, illustrating how each of the pressure pads includes a continuously curving arcuate surface which forms a portion of a cone.

To promote this relatively low level of stress and locking pressure at the crest 34 of the internal thread convolution 16, the concave surfaces 30 of each of the pressure pads 18 to 26 forms a portion of a surface of a cone which extends axially and radially inwardly from its base toward the center of the opening 12. The cones 40 for each of the pressure pads 18 to 26 intersect at the center of the opening 12 in the manner shown schematically in FIG. 3. The cones 40 each have a longitudinal central axis which is disposed at an acute angle of approximately 39.5° relative to a plane extending perpendicular to the central axis of the nut body 42 and opening 12.

The lock thread convolution 16 is formed by first making a standard nut having with a standard thread 58 extending through the axial opening 12. In accordance with common practice, the nut is countersunk adjacent to the outer face 50 of the nut body. Therefore, a funnel-shaped countersink surface 60 flares radially and axially outwardly of the root of the standard thread 58 of the face surface 50 so that the circular line 54 of intersection between the face surface 50 and the opening 12 is disposed radially outwardly of the major or root diameter of the threads 58. The countersink surface 60 extends at an angle or approximately 30° with a plane extending perpendicular to the central axis of the locknut 10.

The pressure pads 18 to 26 are then formed by cold working the end of the standard nut with a forging tool having a plurality of protruding conical surfaces corresponding to the shape of the cones 40. Due to the countersunk configuration of the opening 12, the conical surfaces of the forging tool will cause the metal of the nut body to flow radially inwardly. This radially inward flow of metal is promoted by the fact that the conical forging surfaces on the tool taper inwardly toward the center of the opening 12 and have their relatively large bases disposed radially outwardly of the line of intersection 54 between the opening 12 and face surface 50.

Figure 2:
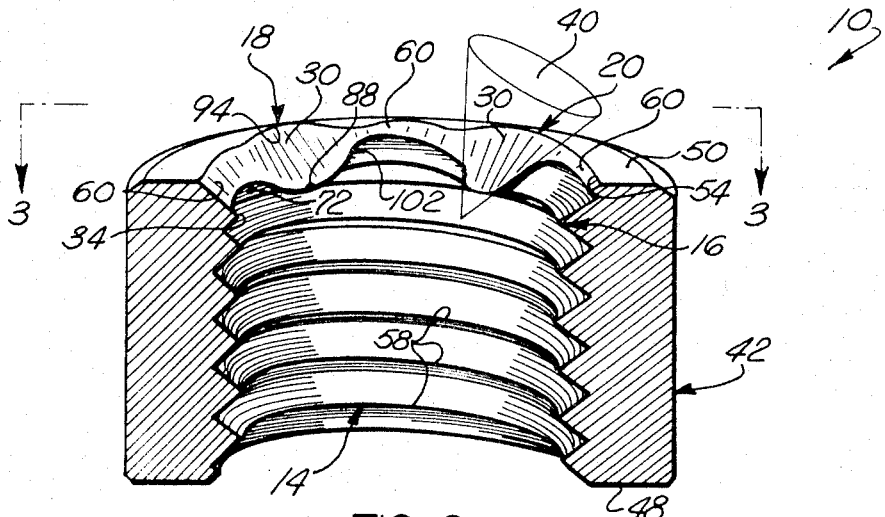
FIG. 2 is a sectional view, taken generally along the line 2—2 of FIG. 1, further illustrating the relationship between the pressure pads and an internal thread convolution of the locknut.

The cones 40 are disposed with their central axis angled axially inwardly at an acute angle to the central axis of the nut 10 (see FIG. 2). Therefore, each of the surfaces 30 has its greatest circumferential extent along the countersink surface 60. Since the metal body 42 of the nut is deflected to the greatest circumferential and axial extent along the surface 60 by the generally conical surface of the forging tool, the metal of the nut is cold worked or forged axially and radially inwardly from an area adjacent to the root of the thread convolution 16. Since the metal of the nut body 42 is cold forged radially and axially inwardly, the metal of the crest 34 of the thread convolution 16 is cold forged and stressed to a far smaller extent than would be the case if the surface 30 had its greatest circumferential extent adjacent to the crest of the thread convolution. In fact, depending upon the location of the surface 30 relative to the thread convolution 16, the innermost part of the crest 34 may not even be engaged by the forging tool.

Figure 4:
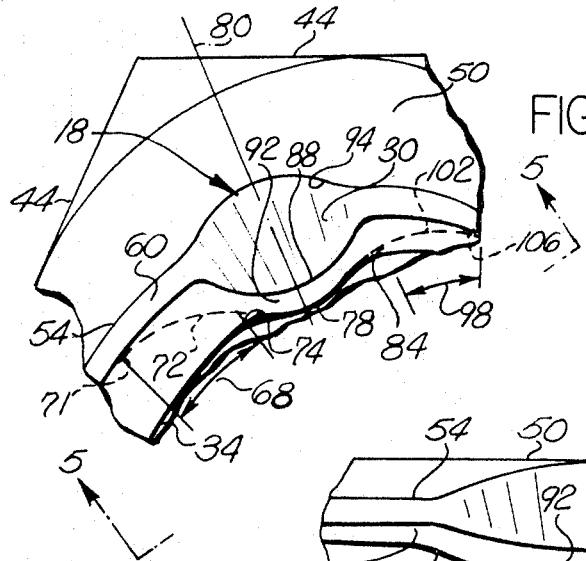
FIG. 4 is an enlarged fragmentary plan view of one of the pressure pads and an outermost thread convolution of the locknut.
Figure 5:
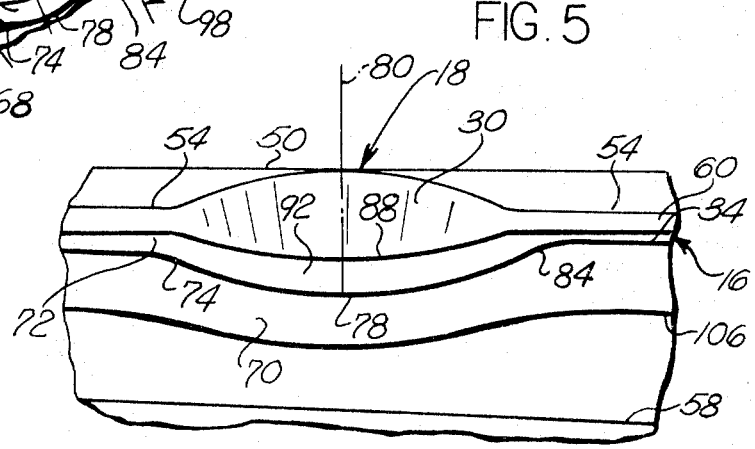
FIG. 5 is an enlarged fragmentary elevational view, taken generally along the line 5—5 of FIG. 4, illustrating an axially offset portion of the outermost thread convolution.

In addition to minimizing residual stresses in the crest 34 of the thread convolution 16 by forming the pressure pads or indentations 18 with a continuously curving concave surface 30, the smooth axially and radially inwardly extending pressure pad 18 deflects the cooperating standard external thread convolution with a minimum of abrasion and stress. Thus, the pressure pad 18 has a circumferentially leading portion 68 (FIG. 4) which is formed by an axially inwardly depressed portion of the inner flank surface 70 (FIG. 5) of the outermost thread convolution 16. This circumferentially leading portion 68 begins at an intersection 71 (FIG. 4) with the root of the thread convolution and extends circumferentially toward the center of the pressure pad 18. As the leading portion 68 extends circumferentially from the intersection 71 with the root of the thread convolution 16, the axially offset leading portion flares radially inwardly along a smooth curve 72 to an intersection 74 with the crest 34 of the thread convolution 16.

Due to the radially inwardly directed flow of metal by the conical forming surfaces on the forging tool, the pressure pad 18 has a ridge portion 78 which projects radially inwardly of the minor diameter of the standard thread 58. This ridge portion 78 extends radially and axially inwardly from the intersection 74 to a summit at a radial axis 80 which is disposed midway between opposite circumferential end portions of the pressure pad 18. The ridge 78 then curves radially and axially outwardly from the axis 80 to a trailing intersection 84 with the crest 34 of the thread convolution 16. It should be noted that the concave surface 30 has a continuously curving radially innermost edge portion 88 which is bowed toward the center of the locknut 10 and is disposed radially outwardly of the crest of the ridge portion 78.

A reduced outer flank surface 92 of the thread convolution 16 extends radially and axially inwardly from the edge portion 88 to the crest of the ridge portion 78. The concave surface 30 has a radially outwardly bowed and continuously curving edge portion 94 which extends outwardly past the circular line 54 into the face surface.

The pressure pad 18 has a circumferentially trailing portion 98 (FIG. 4) which is formed by a continuation of the axially inwardly depressed portion of the inner flank surface 70 of the thread convolution 16. This circumferentially trailing portion 98 begins at the intersection 84 with the ridge portion 78 and extends circumferentially away from the center of the pressure pad 18. As the trailing portion 98 extends circumferentially from the intersection 84, the axially offset trailing portion flares radially outwardly along a smooth curve 102 to an intersection at 106 with the root of the thread convolution 16.

The inner flank surface 70 (FIG. 5) of the thread convolution is continuously curving and free of discontinuities, that is no point on the flank surface 70 between the crest and root of the thread convolution 16 is formed by the intersection of planar surfaces. This continuously curving configuration of the flank surface 70 promotes a smooth engagement with the cooperating external thread convolution without inducing unnecessary stresses in the external thread convolution. In addition, the continuous configuration of the flank surface 70 tends to minimize the formation of stress concentrations in the thread convolution 16.

When the locking thread convolution 16 moves into mating engagement with a standard external thread convolution, the external thread convolution first engages the pressure pad 18 along the axially inwardly curving internal flank surface 72 adjacent to the root of the internal thread convolution 16. At this time there will be little or no interference at the pressure pad 18, between crest 34 of the thread convolution 16 and the external thread convolution. Continued relative rotation between the nut 10 and externally threaded member will move the thread convolution on the externally threaded member into greater and greater engagement with the axially inwardly offset pressure pad portion 18 of the internal screw thread convolution 16. This results in the external screw thread being first deflected adjacent to its crest where it can yield relatively easily and then being smoothly deflected further and further inwardly along its flank surface until the root of the external screw thread is deflected by the inwardly projecting portion 78 of the pressure pad 18. The smooth and gradual deflection of the external screw thread eliminates the generation of unnecessary stress concentrations in either the external screw thread or internal thread convolution 16. Although only the pressure pad or indentation 18 has been fully described herein, it should be understood that the pressure pads 20, 22, 24 and 26 are of the same construction as the pressure pad 18 and cooperate with the externally threaded member in the same manner.

In view of the foregoing description, it can be seen that the locknut 10 includes a plurality of pressure pads or axially offset portions 18 to 26 which provide a firm locking action with a mating externally threaded member. The pressure pads 18 to 26 are formed with a continuous concave surface 30 which is free of discontinuities and which promotes a smooth locking action between the cooperating internal and external threads. To prevent the formation of cracks in the relatively weak crest of the internal thread, the continuously curving arcuate outer surface 30 is formed as a portion of a cone. This results in the surface 30 having its greatest circumferential extent adjacent to the root of the locking thread convolution 16. In addition, by forming the surface 30 as a portion of a cone, the thread convolution 16 is offset axially to the greatest extent adjacent to the root of the thread and is offset axially to a lesser extent at the crest of the thread.

The smooth continuously curving configuration of the concave surface 30 and flank surface 70 provides for a smooth locking engagement between the internal thread convolution 16 a thread convolution on an externally threaded member. This smooth locking engagement enables the nut 10 to provide a locking action with an externally threaded member even though the nut is removed from and screwed back on to the externally threaded member a plurality of times. Of course, the lack of stress concentrations in the nut enable it to withstand repeated impact loadings over a relatively long period of time. It should be understood that although five pressure pads 18 through 26 have been shown in the specific preferred embodiment of the invention illustrated in the drawings, more or less than five pressure pads could be utilized if desired.

I claim:

1. A locknut for cooperating with standard screw thread convolutions on an externally threaded member, said locknut comprising a metal nut body having a countersunk opening extending axially therethrough, a screw thread formed in a sidewall of said opening, said screw thread including a plurality of standard thread convolutions and an outermost thread convolution having axially offset flank sections which are circumferentially spaced apart and are adapted to interfere with the screw thread convolutions on the externally threaded member to provide a locking action between said nut body and the externally threaded member, each of said axially offset flank sections having a radially innermost portion which extends radially inwardly of the crests of said standard thread convolutions and having a continuously curving inner flank surface which has a first circumferential extent at the root of said outermost thread convolution and a second circumerential extent which is smaller than said first circumerential extent at the crest of said outermost thread convolution to provide for frictional engagement between the crest portion of a standard thread convolution on the externally threaded member and said axially offset flank section prior to frictional engagement between the root portion of the thread convolution in the externally threaded member and the axially off set flank section during relative movement between said locknut and the externally threaded member, a face surface circumscribing said countersunk opening adjacent to said outermost thread convolution, said face surface extending transversely to the axis of said nut body and having a generally circularly extending line of intersection with said countersunk opening at locations which are circumferentially spaced from said axially offset flank sections of said outermost thread convolution, and a plurality of arcuate indentations extending axially and radially inwardly from said face surface into said outermost thread convolution at said axially offset sections of said outermost thread convolution, each of said indentations being formed by a continuous concave surface which forms a portion of a cone having a longitudinal axis extending at an acute angle to the axis of said nut body and having a base disposed radially outwardly of the root of said outermost thread convolution and a peak disposed radially inwardly of the crest of said outermost thread convolution, said concave surface having a continuously and radially outwardly curving line of intersection with said face surface, said line of intersection between said concave surface and said face surface being disposed radially outwardly of said circularly extending line of intersection between said countersunk opening and said face surface.

2. A locknut for cooperating with standard screw thread convolutions on an externally threaded member, said locknut comprising a metal nut body having an axially extending opening therethrough, a screw thread formed in a sidewall of said opening, said screw thread including an outermost thread convolution having axially offset flank sections which are circumferentially spaced apart and are adapted to interfere with the screw thread convolutions on the externally threaded member to provide a locking action between said nut body and the externally threaded member, and a face surface disposed at an end of said nut body adjacent to said outermost thread convolution, said face surface extending transversely to the axis of said nut body and having a generally circularly extending line of intersection with said axially extending opening at locations which are circumferentially spaced from said axially offset flank sections of said outermost thread convolution, and a plurality of arcuate indentations extending axially and radially inwardly from said face surface into said outermost thread convolution at said axially offset sections of said outermost thread convolution, each of said indentations being formed by a continuously curving and concave surface which has a maximum extent in a direction extending circumferentially of said opening adjacent the circularly extending line of intersection between said opening and said face surface, said concave surface having a continuously and radially outwardly curving line of intersection with said face surface, said concave surface diminishing in circumferential extent in a direction extending radially inwardly from the circularly extending line of intersection between said opening and face surface to form one of said axially offset sections of said outermost thread convolution.

3. A locknut as set forth in claim 2 wherein said concave surface of each of said indentations forms a portion of circular cone having its peak disposed at the center of said circularly extending line of intersection between said face surface and said axially extending opening.

4. A locknut as set forth in claim 2 wherein said concave surface of each of said indentations forms a portion of a circular cone having its longitudinal axis extending at an acute angle to the longitudinal axis of said opening in said nut body.

5. A locknut as set forth in claim 2 wherein said concave surfaces of each of said indentations forms a portion of a circular cone having a longitudinal axis extending inwardly from a base of the cone to a common point of intersection.

6. A locknut as set forth in claim 2 wherein said axially offset flank sections of said outermost screw thread convolution have a smaller minor diameter than adjacent sections of said outermost screw thread convolution.

7. A locknut as set forth in claim 2 wherein said axially offset flank sections of said outermost screw thread convolution have root portions which are of a greater circumferential extent than their crest portions.

* * * * *